(12) United States Patent
Miyauchi et al.

(10) Patent No.: US 12,059,874 B2
(45) Date of Patent: Aug. 13, 2024

(54) FIXING ROTATING MEMBER, FIXING APPARATUS, ELECTROPHOTOGRAPHIC IMAGE FORMING APPARATUS, AND METHOD FOR PRODUCING FIXING ROTATING MEMBER

(71) Applicant: CANON KABUSHIKI KAISHA, Tokyo (JP)

(72) Inventors: Yohei Miyauchi, Tokyo (JP); Yasuharu Notoya, Tokyo (JP); Naoko Kasai, Kanagawa (JP); Yusuke Baba, Kanagawa (JP); Masaaki Takahashi, Kanagawa (JP); Hiroki Muramatsu, Tokyo (JP); Ryo Ishifuji, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 17/554,231

(22) Filed: Dec. 17, 2021

(65) Prior Publication Data

US 2022/0206421 A1   Jun. 30, 2022

(30) Foreign Application Priority Data

Dec. 25, 2020  (JP) .................. 2020-217946
Nov. 30, 2021  (JP) .................. 2021-194224

(51) Int. Cl.
*G03G 15/20* (2006.01)
*B32B 1/08* (2006.01)
(Continued)

(52) U.S. Cl.
CPC .............. *B32B 27/304* (2013.01); *B32B 1/08* (2013.01); *B32B 27/285* (2013.01); *B32B 33/00* (2013.01);
(Continued)

(58) Field of Classification Search
CPC ....... B32B 1/08; B32B 27/285; B32B 27/304; B32B 33/00; B32B 2260/02;
(Continued)

(56) References Cited

U.S. PATENT DOCUMENTS

| | | |
|---|---|---|
| 5,608,508 A | 3/1997 | Kumagai et al. |
| 7,142,803 B2 | 11/2006 | Koyama et al. |

(Continued)

FOREIGN PATENT DOCUMENTS

| | | |
|---|---|---|
| CN | 1126329 A | 7/1996 |
| CN | 1629750 A | 6/2005 |

(Continued)

OTHER PUBLICATIONS

"Krytox", acquired from https://cdn.shopify.com/s/files/1/0270/6758/0483/files/Krytox_GPL_Typical_Properties-TMC.pdf?v=1597330049 (Year: 2015).*

(Continued)

*Primary Examiner* — Gerard Higgins
(74) *Attorney, Agent, or Firm* — Venable LLP (57) ABSTRACT

A fixing rotating member comprising a base layer, an elastic layer and a surface layer, in this order, the surface layer containing PFA and PFPE, and having pores with openings at a first surface; at least part of the pores containing the PFPE, wherein when after removing the PFPE in the pores, placing a first observation region on the first surface, defining a ratio of a sum of areas of the openings in the first observation region relative to an area of the first observation region as P1; and placing a second observation region in a cross section of the surface layer, and defining a ratio of a sum of areas of the pores in the second observation region relative to an area of the second observation region as P2, P2/P1 is 1.3 or higher.

14 Claims, 3 Drawing Sheets

(51) Int. Cl.
    *B32B 27/28*     (2006.01)
    *B32B 27/30*     (2006.01)
    *B32B 33/00*     (2006.01)

(52) U.S. Cl.
    CPC ...... *G03G 15/2057* (2013.01); *B32B 2260/02* (2013.01); *B32B 2260/046* (2013.01); *B32B 2433/00* (2013.01)

(58) Field of Classification Search
    CPC .......... B32B 2260/046; B32B 2433/00; B32B 2597/00; G03G 15/2053; G03G 15/2057; G03G 15/206
    See application file for complete search history.

(56) References Cited

U.S. PATENT DOCUMENTS

| | | | |
|---|---|---|---|
| 8,688,022 | B2 | 4/2014 | Sudo et al. |
| 8,865,306 | B2 | 10/2014 | Wu et al. |
| 9,164,450 | B2 | 10/2015 | Matsumoto et al. |
| 10,379,464 | B2 | 8/2019 | Muramatsu et al. |
| 10,739,712 | B2 | 8/2020 | Miyauchi et al. |
| 10,901,354 | B2 | 1/2021 | Notoya et al. |
| 10,983,466 | B2 | 4/2021 | Miyauchi et al. |
| 11,137,707 | B2 | 10/2021 | Asaka et al. |
| 11,181,856 | B2 | 11/2021 | Miyauchi et al. |
| 2010/0119269 | A1 | 5/2010 | Kondoh et al. |
| 2017/0307990 | A1 | 10/2017 | Sakimura et al. |
| 2018/0043656 | A1 | 2/2018 | Song et al. |
| 2020/0086282 | A1 | 3/2020 | Tezuka et al. |
| 2020/0086283 | A1 | 3/2020 | Tezuka et al. |
| 2020/0354533 | A1 | 11/2020 | Tuszynski et al. |
| 2021/0003953 | A1 | 1/2021 | Miyauchi et al. |
| 2021/0134534 | A1 | 5/2021 | Toshinari |

FOREIGN PATENT DOCUMENTS

| | | | |
|---|---|---|---|
| CN | 102799094 | A | 11/2012 |
| CN | 103454887 | A | 12/2013 |
| CN | 107305324 | A | 10/2017 |
| CN | 111886550 | A | 11/2020 |
| EP | 2 098 918 | A2 | 9/2009 |
| EP | 2 210 921 | A1 | 7/2010 |
| EP | 3770688 | A1 * | 1/2021 ........... B32B 15/082 |
| JP | 2-187436 | A | 7/1990 |
| JP | 5-269944 | A | 10/1993 |
| JP | 7-242768 | A | 9/1995 |
| JP | 9-255807 | A | 9/1997 |
| JP | 11-227143 | A | 8/1999 |
| JP | 2004-29607 | A | 1/2004 |
| JP | 2006-305937 | A | 11/2006 |
| JP | 2018-180488 | A | 11/2018 |
| JP | 2019-192749 | A | 10/2019 |
| JP | 2020-007678 | A | 1/2020 |
| JP | 2020-140185 | A | 9/2020 |
| WO | 90/08218 | A1 | 7/1990 |
| WO | 2018/116517 | A1 | 6/2018 |
| WO | 2019/181796 | A1 | 9/2019 |
| WO | 2022/138491 | A1 | 6/2022 |

OTHER PUBLICATIONS

International Search Report in International Application No. PCT/JP2021/046737 (Mar. 2022).
Written Opinion in International Application No. PCT/JP2021/046737 (Mar. 2022).
Jui-Cheng Yen et. al, "A New Criterion for Automatic Multilevel Thresholding," 4(3) IEEE T. Image Process. 370-378 (Mar. 1995).
Nobuyuki Otsu, "A Threshold Selection Method from Gray-Level Histograms," SMC-9, No. 1 IEEE T. Syst. Man. Cyb. 62-66 (Jan. 1979).
Y. Kitazaki et al, "Extended Fowkes' Equation and Evaluation of Surface Tension of Polymer Solid," 8(3) J. Adhes. Soc. Jpn. 131-141 (1972).
Extended European Search Report in European Application No. 21217387.6 (May 2022).
U.S. Appl. No. 17/554,211, filed Dec. 17, 2021, Kasai et al.
U.S. Appl. No. 17/554,192, filed Dec. 17, 2021, Muramatsu et al.
WO 2019/181796 JP 2020-140185, U.S. Pat. No. 10,739,712 B2 U.S. Pat. No. 10,901,354 B2 U.S. Pat. No. 10,983,466 B2 2021/0003953 A1 U.S. Pat. No. 11,181,856 B2.
WO 2018/116517, 2020/0086282 A1 2020/0086283 A1.
JP 2019-192749, 2021/0134534 A1.
Non-final Office Action in U.S. Appl. No. 17/554,192 (Jan. 2024).
U.S. Appl. No. 18/336,150, filed Jun. 16, 2023, Baba et al.
First Office Action in Chinese Application No. 202111590667.8 (Apr. 2024).

* cited by examiner

FIXING ROTATING MEMBER, FIXING APPARATUS, ELECTROPHOTOGRAPHIC IMAGE FORMING APPARATUS, AND METHOD FOR PRODUCING FIXING ROTATING MEMBER

BACKGROUND OF THE INVENTION

Field of the Invention

The present disclosure relates to a fixing rotating member, a fixing apparatus, and an electrophotographic image forming apparatus.

Description of the Related Art

In a fixing apparatus utilized in an electrophotographic image forming apparatus (hereafter also referred to as "image forming apparatus") such as a copier or a laser printer, rotating members in the form of a pair of heated rollers, a film and a roller, a belt and a roller, or a belt and a belt, are in pressure contact against each other. A recording medium such as paper, holding thereon an image formed by unfixed toner, is introduced into a pressure-contact portion (hereafter referred to as "fixing nip portion") formed between the rotating members, and the unfixed toner is melted through heating, to fix an image on the recording medium. The fixing rotating member with which the unfixed toner image on the recording medium comes into contact may be referred to as a fixing roller, a fixing film or a fixing belt, depending on the form in which the member is embodied.

Paper media used for forming electrophotographic images have become growingly diverse in recent years, and for instance there is a demand for accommodating thin paper, for instance paper having a basis weight of 52 g/m$^2$. In a conventional fixing member such as a fixing rotating member, however, molten toner at the time of heat fixing might in some instances adhere to the surface of the fixing rotating member, as a result the thin paper wraps around the fixing rotating member, on account of the low rigidity of such thin paper. In order to stably form electrophotographic images on thin paper it is thus necessary to impart higher toner releasability to the surface of the fixing rotating member. WO 2019/181796 discloses a fixing member whose a surface layer contains a fluororesin and a perfluoropolyether (hereafter also referred to as "PFPE"), such that the fixing member can maintain high toner releasability over long periods of time.

Studies by the inventors reveal that the fixing member according to WO 2019/181796 exhibits excellent toner releasability over long periods of time. However, WO 2019/181796 (paragraph [0018]) indicates that fluorine oil is present, without phase separation from the fluororesin, in the surface layer of the disclosed fixing member. In such a case there is a limit to the amount of fluorine oil that can be incorporated into the surface layer. It was therefore found that in order to impart excellent toner releasability over longer periods of time to the fixing rotating member, a technique needs to be developed that aims at providing a fixing rotating member capable of holding a larger amount of PFPE and the PFPE can be supplied stably to the outer surface of the fixing rotating member.

SUMMARY OF THE INVENTION

At least one of aspects of the present disclosure is directed to providing a fixing rotating member capable of maintaining high toner releasability over longer periods of time than in conventional instances, and at providing a method for producing the fixing rotating member. Another aspect of the present disclosure is directed to providing a fixing apparatus and an electrophotographic image forming apparatus capable of stably forming high-quality electrophotographic images over long periods of time.

According to one aspect of the present disclosure, there is provided a fixing rotating member comprising a base layer, an elastic layer and a surface layer, in this order, the surface layer containing a tetrafluoroethylene-perfluoroalkyl vinyl ether copolymer and a perfluoropolyether; the surface layer having pores with openings at a first surface thereof constituting an outer surface of the fixing rotating member; at least part of the pores containing the perfluoropolyether, wherein when a first observation region having 8 μm long×11 μm wide is placed on the first surface of the surface layer after removing the perfluoropolyether in the pores, and a ratio of a total sum of areas of the openings observed in the first observation region relative to an area of the first observation region is defined as P1; and when a second observation region having 8 μm long×11 μm wide is placed in a cross section of the surface layer after removing the perfluoropolyether in the pores, the cross section including an entire thickness portion of the surface layer along a circumferential direction of the fixing rotating member, and a ratio of a total sum of areas of the pores observed in the second observation region relative to an area of the second observation region is defined as P2, P2/P1 is 1.3 or higher.

According to another aspect of the present disclosure, there is provided a fixing apparatus, comprising the above-mentioned fixing rotating member, and heating means for heating the fixing rotating member.

According to yet another aspect of the present disclosure, there is provided an electrophotographic image forming apparatus, comprising the above-mentioned fixing apparatus.

According to still another aspect of the present disclosure, there is provided a method for producing a fixing rotating member, the method comprising the steps of:
(i) providing a layered body comprising
  a base layer having an endless belt shape or a roller shape,
  an elastic layer on an outer peripheral surface of the base layer, and
  a resin layer comprising a tetrafluoroethylene-perfluoroalkyl vinyl ether copolymer, on an outer peripheral surface of the elastic layer;
(ii) immersing the layered body in a first perfluoropolyether at a temperature of 300±50° C., to impregnate the resin layer with the perfluoropolyether;
(iii) cooling the layered body, obtained in step (ii), of which the resin layer is impregnated with the perfluoropolyether;
(iv) removing at least part of the perfluoropolyether impregnated into the resin layer with a fluorosolvent, to form, in the resin layer, pores with openings at a first surface of the resin layer; and
(v) incorporating a second perfluoropolyether into at least part of the pores, to obtain a fixing rotating member having a surface layer comprising the second perfluoropolyether in at least part of the pores.

Further features of the present disclosure will become apparent from the following description of exemplary embodiments with reference to the attached drawings.

DESCRIPTION OF THE EMBODIMENTS

Further, in the present disclosure, the expression of "from XX to YY" or "XX to YY" indicating a numerical range means a numerical range including a lower limit and an upper limit which are end points, unless otherwise specified. When numerical value ranges are provided in stages, the upper limits and lower limits of the respective numerical values can be combined in any combination.

The inventors have conducted repeated studies with a view to obtaining a fixing rotating member capable of maintaining excellent toner releasability even upon prolonged use. As a result, the inventors found that the above goal can be attained by prescribing that a surface layer contains a tetrafluoroethylene-perfluoroalkyl vinyl ether copolymer (PFA); the surface layer has pores having openings in a first surface that constitutes an outer surface of the fixing rotating member; at least part of the pores contains a perfluoropolyether; and an opening ratio P1 of the pores in the outer surface and a porosity P2 of the openings in a cross section are set to lie in the ranges set forth above.

Since the surface layer has pores, the surface layer can contain PFPE in the pores. As a result, a greater amount of PFPE can be held in the surface layer of the above fixing rotating member than in the surface layer disclosed in WO 2019/181796 in which PFPE is held within a fluororesin in a state without phase separation.

The openings of the pores are at the first surface of the surface layer, which constitutes an outer surface of the fixing rotating member, and hence the PFPE within the pores can migrate to the first surface. Further, the amount of PFPE that migrates from within the pores to the outer surface can be controlled by setting a relationship between a proportion P1 of opening area per unit area of the outer surface of the surface layer, and a proportion P2 of pore area per unit area of a cross section of the surface layer, to obey $P2/P1 \geq 1.3$. It is considered that, as a result, the fixing rotating member according to the present aspect can maintain excellent toner releasability for longer periods of time than the fixing member according to WO 2019/181796.

The reference symbols in the figures are as follows.
1: resin portion containing PFA, 2: openings, 3: pores, 4, PFPE, 101: first surface The fixing rotating member will be described in detail below.

1. Fixing Rotating Member

The fixing rotating member is for instance a fixing roller, a fixing film, a fixing belt or the like. The fixing rotating member has a base layer, an elastic layer and a surface layer, in this order.

Figures 2A, 2B:
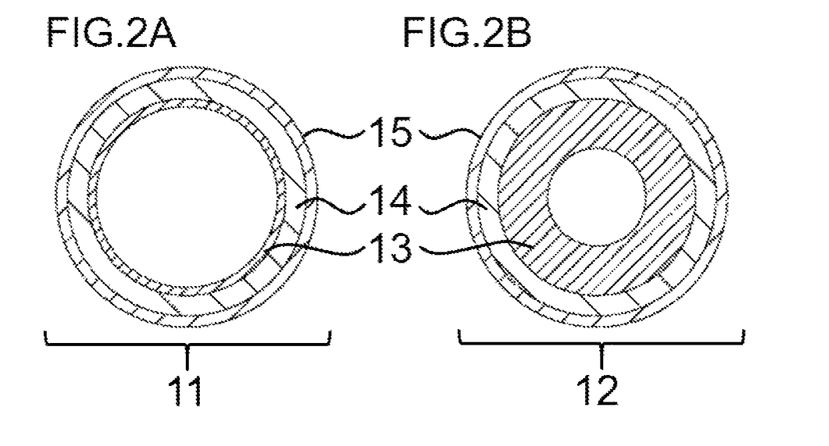
FIGS. 2A and 2B are respectively a cross-sectional schematic diagram of a fixing belt (A) and a fixing roller (B)

FIG. 2A and FIG. 2B are cross-sectional diagrams illustrating different forms of fixing rotating members. FIG. 2A illustrates a fixing rotating member having an endless belt shape (hereafter also referred to as "fixing belt 11"), and FIG. 2B illustrates a fixing rotating member having a roller shape (hereafter also referred to as "fixing roller 12").

The fixing rotating members in FIG. 2A and FIG. 2B each have a base layer 13, an elastic layer 14 that covers the outer surface of the base layer 13, and a surface layer 15 that covers the surface, of the elastic layer, on the reverse side from that of the face opposing the base layer. The surface layer 15 may be bonded, by way of an adhesive not shown, to the surface of the elastic layer 14 on the reverse side from that opposing the base layer.

(1) Base Layer

A known material used as a base layer of fixing members such as fixing rotating members can be utilized, without particular limitations, as the material of the base layer 13. For instance, a metal or alloy such as aluminum, iron, stainless steel or nickel, or a heat-resistant resin such as polyimide, is used herein.

A base material having an endless belt shape may be used as the base layer 13 in the fixing belt 11. Examples of the material of the base layer 13 in this case include materials exhibiting excellent heat resistance, such as nickel, stainless steel and polyimide. The thickness of the base layer 13 is not particularly limited, but is preferably from 20 μm to 100 μm, for instance from the viewpoint of strength, flexibility and heat capacity.

For instance a solid or hollow core metal is used as the base layer 13 in the fixing roller 12. Examples of the material of the core metal include metals and alloys such as aluminum, iron and stainless steel. In a case where a hollow core metal is used, a heat source can be provided in the interior thereof.

The outer surface of the base layer 13 may be subjected to a surface treatment in order to impart adhesiveness towards the elastic layer 14. The surface treatment that is resorted to may be a physical treatment such as blasting, lapping or polishing, or a chemical treatment such as an oxidation treatment, a coupling agent treatment or a primer treatment, singly or in the form of a combination of a plurality of treatments.

In a case where an elastic layer 14 containing silicone rubber is provided on the surface of the base layer 13, it is preferable to perform a primer treatment on the surface of the base layer 13, in order to improve adhesiveness between the base layer 13 and the elastic layer 14.

Examples of primers used in primer treatments include coating materials in which a silane coupling agent, a silicone polymer, a hydrogenated methylsiloxane, an alkoxysilane, a reaction promoting catalyst and/or a colorant such as red iron oxide, are mixed and dispersed as appropriate in an organic solvent.

The primer can be selected as appropriate depending on the material of the base layer 13, the type of the elastic layer 14, and the form of crosslinking reactions. A primer containing hydrosilyl groups is preferably used in a case in particular where the elastic layer 14 contains a large amount of unsaturated aliphatic groups, in order to impart adhesiveness derived from a reaction with the unsaturated aliphatic groups. A primer containing unsaturated aliphatic groups is preferably used in a case where the elastic layer 14 contains a large amount of hydrosilyl groups, Other primers include primers containing alkoxy groups. A commercially available product can be used as the primer. The primer treatment includes a step of applying the primer onto the outer surface of the base layer 13 (surface bonded to the elastic layer 14), with drying or baking.

(2) Elastic Layer

The material of the elastic layer 14 is not particularly limited, and there can be used a known material utilized as an elastic layer in fixing rotating members. Preferably, the elastic layer 14 contains a silicone rubber having excellent heat resistance. An addition-curable liquid silicone rubber is preferably used as the starting material of the silicone rubber.

The thickness of the elastic layer 14 can be designed as appropriate taking into consideration the surface hardness of the fixing rotating member and the width of the fixing nip portion that is to be formed. In a case where the fixing rotating member is the fixing belt 11, the thickness of the elastic layer 14 is preferably from 100 µm to 500 µm, more preferably from 200 µm to 400 µm.

In a case where the fixing rotating member is the fixing roller 12, the thickness of the elastic layer 14 is preferably from 0.1 mm (100 µm) to 3.0 mm, more preferably from 0.3 mm (300 µm) to 2.0 mm.

By setting the thickness of the elastic layer 14 to lie within this range it becomes possible to secure a sufficient width of the fixing nip portion at a time where the fixing rotating member is built into the fixing apparatus.

By virtue of the fact that the elastic layer contains silicone rubber of poor chemical affinity with fluorine oils, the fluorine oil contained in the surface layer does not easily migrate to the elastic layer, even after prolonged use, and is solely supplied to the surface of the fixing rotating member.

The elastic layer 14 may contain a filler. The filler is added in order to control thermal conductivity, heat resistance and elastic modulus.

Specific examples include silicon carbide (SiC), silicon nitride ($Si_3N_4$), silica ($SiO_2$), boron nitride (BN), aluminum nitride (AlN), alumina ($Al_2O_3$), iron oxide ($Fe_2O_3$), zinc oxide (ZnO), magnesium oxide (MgO), titanium oxide ($TiO_2$), copper (Cu), aluminum (Al), silver (Ag), iron (Fe), nickel (Ni), carbon black (C), carbon fibers (C) and carbon nanotubes (C).

(3) Surface Layer

Figures 1A, 1B, 1C:
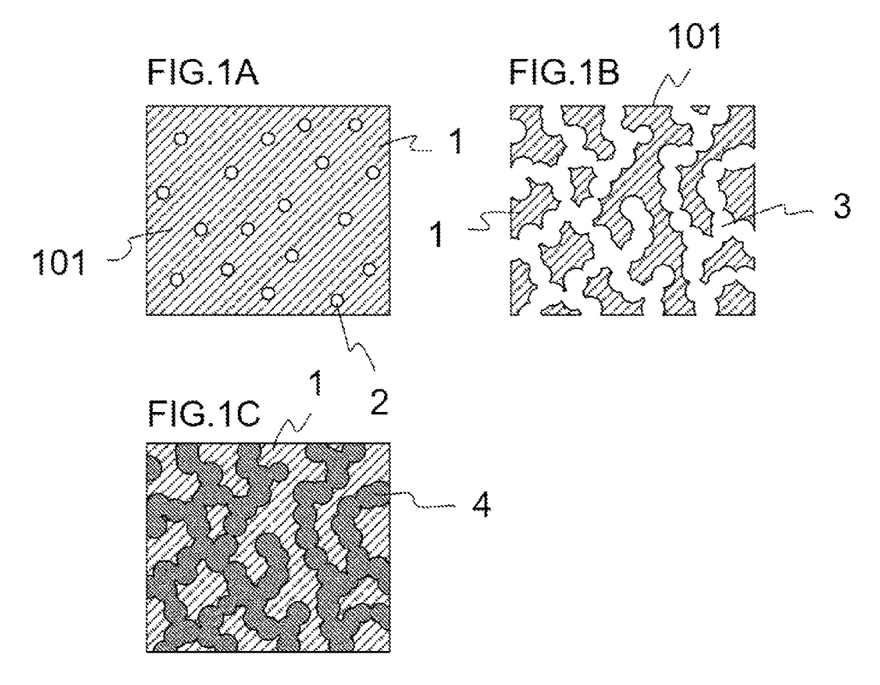
FIGS. 1A to 1C are respectively a surface observation image (A) of a resin layer of a fixing rotating member according to Example 1, a cross-sectional image (B) of the resin layer, and a cross-sectional image (C) of a surface layer, upon observation of a cross section along a belt circumferential direction.

A surface layer 15 contains a tetrafluoroethylene-perfluoroalkyl vinyl ether copolymer (PFA) and a perfluoropolyether (PFPE). As illustrated in FIG. 1B, the surface layer has pores 3 with openings at a first surface 101 that constitutes the outer surface of the fixing rotating member. The outer surface of the fixing rotating member is defined as the surface that comes in contact with unfixed toner on the material to be recorded at the time of fixing. Preferably, the pores 3 do not have a shell.

That is, the wall of the pores 3 is preferably made up of a solid portion of the surface layer, specifically, of a resin portion 1 that contains PFA.

At least part of the pores contains a perfluoropolyether (PFPE) 4. For example, the pores are filled with PFPE.

The surface layer further satisfies the following requirement.

(Requirement) When a first observation region having 8 µm long×11 µm wide is placed on the first surface of the surface layer after removing the PFPE in the pores with a solvent from the side of the first surface, and a ratio (hereafter also referred to as "opening ratio") of the total sum of the areas of the openings observed in the first observation region relative to the area of the first observation region is defined as P1. When a second observation region having 8 µm long×11 µm wide is placed at a predetermined position in a cross section of the surface layer after removing the PFPE in the pores with a solvent from a side of the first surface, the cross section including an entire thickness portion of the surface layer along a circumferential direction of the fixing rotating member, and a ratio (porosity) of the total sum of the areas of the pores observed in the second observation region relative to the surface area of the second observation region is defined as P2. P1 and P2 satisfy the following relationship:

P2/P1 is 1.3 or higher.

By prescribing P1 and P2 to obey the above relationship, the surface layer can hold a sufficient amount of PFPE, and PFPE can be stably transferred to the first surface. Herein P2/P1 is preferably 5.0 or higher, more preferably 7.0 or higher. From the viewpoint of striking a balance between the amount of PFPE that the surface layer can hold and migration of PFPE to the first surface, the upper limit of P2/P1 is preferably 20.0 or lower, more preferably 15.0 or lower. That is, for example, preferable range of P2/P1 is 1.3 or higher, and 20.0 or lower.

Herein P1 is calculated in accordance with following method. The first surface of the surface layer constituting the outer surface of the fixing rotating member is observed with a scanning electron microscope, to obtain a SEM image (10000 magnifications) of an observation region 8 µm long×11 µm wide of the first surface. The resolution (for instance 717 pixels longitudinally and 986 pixels transversally) is set herein so that individual openings can be recognized.

The SEM image is converted into an 8-bit gray scale image using image processing software (product name: ImageJ, by the National Institutes of Health (NIH)). A median filter is applied to the obtained gray scale image, and thereafter a binarization process is further carried out using the above image processing software, to obtain a binarized image. The binarization process relies herein on the YEN method as disclosed in "IEEE Transactions on Image Processing Vol. 4, Issue: 3, March 1995 pp. 370-378" in order to discriminate between portions corresponding to the openings, in the SEM image, and portions corresponding to PFA.

A ratio of the number of pixels of the portions corresponding to the openings in the obtained binarized image, relative to the number of pixels of the entire image, is then calculated. In the present disclosure observation regions are disposed at 10 arbitrary locations on the first surface of the surface layer, and the arithmetic mean value of the ratio calculated from each observation region is taken as P1. The 10 locations at which the observation regions are placed are set to positions such that the respective observation regions do not overlap each other. A concrete method involved will be described in examples described below.

Further, P2 is calculated in accordance with the following method. A sample of the surface layer is cut out such that on the sample there appears a cross section in a direction along the circumferential direction of the fixing rotating member, from the surface layer. The cross section includes the entire thickness portion of the surface layer. A predetermined position of the cross section of the sample thus cut out is observed using a scanning electron microscope, to yield a SEM image of a rectangular observation region 8 µm long×11 µm wide of the cross section. The resolution (for instance 717 pixels longitudinally and 986 pixels transversally) is set so that the pores appearing in the cross section can be discerned.

The SEM image is binarized using numerical calculation software (product name: MATLAB; by The MathWorks, Inc.) to obtain a binarized image. The binarization process relies on Otsu's method as disclosed in "IEEE Transactions on SYSTEMS, MAN, AND CYBERNETICS, vol. SMC-9, No. 1, January 1979, pp. 62-66", in order to discriminate between portions corresponding to the pores and portions corresponding to PFA in the SEM image. A ratio of the number of pixels of the portions corresponding to the pores in the binarized image relative to the number of pixels of the entire image is then calculated. In the present disclosure, the following applies to the thickness direction of the surface layer in the cross section:

(1) a position such that the upper end of the observation region lies 1 μm off the first surface side of the cross section towards the second surface on the opposite side, and the long sides of the observation region are parallel to the first surface;

(2) a position such that a midpoint of the cross section between the first surface and the second surface coincides with the barycenter of the observation region, and the long sides of the observation region are parallel to the first surface, and (3) a position such that the lower end of the observation region lies 1 μm off the second surface towards the first surface, and the long sides of the observation region are parallel to the second surface.

Samples for the above operation are acquired from three locations at every 120° in the circumferential direction of the fixing rotating member. Therefore, P2 is the arithmetic mean value of nine ratios above calculated from a total of nine SEM images.

Herein P1 is preferably 1.0% or higher, more preferably 1.5% or higher, and further 3.0% or higher. The upper limit of P1 is preferably 15.0% or lower, and more preferably 10.0% or lower.

By virtue of the fact that P1 is 1.0% or higher, migration of PFPE in the pores towards the first surface of surface layer is hindered less readily, and stable toner releasability can be imparted to the first surface. When P1 is 15.0% or lower, excessive migration of PFPE in the pores to the first surface can be suppressed, which contributes to maintaining stable toner releasability over long periods of time. Thus, for example, the preferable range of P1 is 1.0% or higher and 15.0% or lower, and more preferable range of P1 is 1.5% or more and 10.0% or lower.

Herein P2 is preferably 20.0% or higher, more preferably 25.0% or higher. The upper limit of P2 is not particularly restricted, but is preferably 60.0% or lower, more preferably 50.0% or lower.

When P2 is 20.0% or higher, the surface layer can hold more PFPE and can impart stable toner releasability to the first surface over longer periods of time. On the other hand, wear of the surface layer can be better prevented by setting P2 to be 60.0% or lower. Thus, for example, preferable range of P2 is 20.0% or higher and 60.0% or lower, and more preferable range of P2 is 25.0% or higher and 50.0% or lower.

The average opening diameter of the openings in the outer surface of the surface layer is preferably from 1 nm to 5 μm, more preferably from 50 nm to 140 nm. Keeping the average opening diameter within the above ranges contributes to maintaining superior toner releasability stably. The average opening diameter of the openings in the first surface is herein the average value of the diameters of circles having the same surface area as the surface area of portions corresponding to the openings, from the binarized image used for the calculation of P1 described above. The concrete method involved will be described further on.

The thickness of the surface layer is preferably from 12 μm to 100 μm, more preferably from 15 μm to 85 μm.

PFA

The PFA contained in the surface layer will be described in detail next.

Herein PFA is a copolymer of perfluoroalkyl vinyl ether (hereafter "PAVE") and tetrafluoroethylene (hereafter "TFE"). The number of carbon atoms of the perfluoroalkyl chain of PAVE is preferably 1 to 6, more preferably 1 to 4, and yet more preferably 1 to 3.

Further, PAVE is preferably selected from among perfluoromethyl vinyl ether ($CF_2$=CF—O—$CF_3$), perfluoroethyl vinyl ether ($CF_2$=CF—O—$CF_2CF_3$) and perfluoropropyl vinyl ether ($CF_2$=CF—O—$CF_2CF_2CF_3$).

The melting point of PFA is preferably 280° C. to 320° C., more preferably 290° C. to 310° C.

A commercially available product can be used as the PFA; concrete examples are given below.

"451HP-J" "959HP-Plus", "350-J" and "950HP-Plus" (all product names, by Chemours-Mitsui Fluoroproducts Co., Ltd.);

"P-66P", "P-66PT" and "P-802UP" (all product names, by AGC Inc.);

"AP-230", "AP-231SH" and the like (all product names, by Daikin Industries, Ltd.); and

"6502N" (product name, by The 3M Company.).

Perfluoropolyether (PFPE)

The PFPE contained in at least part of the pores will be described in detail next. The PFPE in the pores may be referred to as a "second" PFPE in order to distinguish it from the below-described PFPE (first PFPE) used for forming the pores. However, this does not rule out the second PFPE being the same PFPE as the first PFPE.

The second PFPE is not particularly limited, and known instances of PFPE can be used.

As the second PFPE, PFPE having the structure represented by Formula (1) below may preferably be employed. The PFPE is preferably oily at the melting point of PFA.

(1)

In Formula (1), a, b, c, d, e and f are each independently 0 or a positive integer, satisfy 1≤a+b+c+d+e+f≤600, and at least one from among a, b, c and d represents a positive integer.

Further, the order in which each repeating unit is present in Formula (1) is not limited to the order described above. Further, each repeating unit in Formula (1) may be present at a plurality of sites in the PFPE. That is, the PFPE represented by Formula (1) may be a block copolymer or a random copolymer.

Examples of commercially available PFPE include for instance a PFPE having the structure represented by Formula (2) below (for instance Demnum S-200 and Demnum S-65 (both product names); by Daikin Industries, Ltd.), PFPE having the structure represented by Formula (3) below

(for instance Krytox XHT-1000, Krytox VPF16256, Krytox GPL-107, Krytox GPL-106, Krytox GPL-105, Krytox GPL-104, Krytox GPL-103, Krytox GPL-102 and Krytox GPL-101 (all product names); by The Chemours Company), PFPE having the structure represented by Formula (4) below (for instance Fomblin M60, Fomblin M100 and Fomblin Z25 (all product names); by Solvay Specialty Polymers Co., Ltd.), and PFPE represented by Formula (5) below (for instance Fomblin Y45 and Fomblin Y25 (both product names); by Solvay Specialty Polymers Co., Ltd.).

Preferably, the perfluoropolyether has at least one structure selected from the group consisting of Formulas (2) to (5) below.

(2)

In Formula (2), n is a positive number, n lying in a range such that PFPE viscosity at a temperature of 40° C. ranges 30 to 500 mPa·s.

(3)

In Formula (3), n' is a positive number, n' lying in a range such that PFPE viscosity at a temperature of 40° C. ranges 10 to 2500 mPa·s.

(4)

In Formula (4), n" and m are each independently a positive number, m/n" is a number from 0.5 to 2, and n"+m is a number lying in a range such that PFPE viscosity at a temperature of 40° C. ranges 20 to 1400 mPa·s.

(5)

In Formula (5), n'" and m' are each independently a positive number, m'/n'" is a number from 20 to 1000, and n'"+m' is a number lying in a range such that PFPE viscosity at a temperature of 40° C. ranges 20 to 1200 mPa·s.

The viscosity of the second PFPE is preferably 300 mPa·s to 2500 mPa·s, more preferably 350 mPa·s to 2000 mPa·s. Herein a PFPE within such a viscosity range contributes to a stable migration thereof from the pores to the first surface of the surface layer.

The term viscosity as used herein denotes a value of viscosity obtained after 60 seconds of rotation at a shear velocity of 100 s$^{-1}$ and at a measurement temperature of 40° C. using a rheometer (by TA Instruments Inc.: DHR-2) having attached thereto a cone plate having a cone angle of 1° and a cone radius of 20 mm.

Examples of commercially available PFPE within the above viscosity range include for instance "Krytox GPL-105" (viscosity 301 mPa·s), "Krytox GPL-106" (viscosity 459 mPa·s), "Krytox GPL-107" (viscosity 852 mPa·s), "Krytox VPF16256" (viscosity 1403 mPa·s), "Krytox XHT-1000" (viscosity 1941 mPa·s), "Fomblin M60" (viscosity 586 mPa·s) and "Fomblin M100" (viscosity 1327 mPa·s).

The content of perfluoropolyether in the surface layer is preferably from 20 mass % to 60 mass %, more preferably from 25 mass % to 45 mass %. When the content is 20 mass % or higher, toner releasability is yet better preserved over long periods of time. When the content is 60 mass % or lower, wear arising from the use of the surface layer can be more reliably prevented.

Method for Producing Fixing Rotating Member

A non-limiting exemplary method for producing the above-described fixing rotating member according to one aspect of the present disclosure includes steps (i) through (v) below.

Step (i): step of providing a layered body comprising a base layer having an endless belt shape or a roller shape, an elastic layer on an outer peripheral surface of the base layer, and a resin layer comprising PFA, on an outer peripheral surface of the elastic layer.

Step (ii): a step of bringing the first PFPE, at a temperature near the melting point of PFA, into contact with the surface, of the resin layer, on the reverse side from that facing the elastic layer, to thereby impregnate the resin layer with the first PFPE;

step (iii): step of cooling the layered body, obtained in step (ii), of which the resin layer is impregnated with the first PFPE, down to room temperature (for instance a temperature 20° C. to 35° C., preferably 25° C.);

step (iv): step of removing at least part of the first PFPE impregnated into the resin layer with a fluorosolvent, from a first surface-side of the resin layer, to thereby form, in the resin layer, pores having openings at the first surface of the resin layer; and step (v): step of incorporating the second PFPE into at least part of the pores, to thereby make the resin layer into the surface layer according to the present disclosure, and obtain a fixing rotating member having a surface layer comprising the second perfluoropolyether in at least part of the pores.

The inventors conjectured the following concerning the mechanism whereby the fixing rotating member according to one aspect of the present disclosure is formed by resorting to the above method.

In step (ii), the first surface of the resin layer is brought into contact with the first PFPE at a temperature near the melting point of the PFA contained in the resin layer (temperature of 300° C.±50° C. (preferably of 290° C. to 325° C.)), as a result of which the resin layer becomes impregnated with the first PFPE.

The resin layer impregnated with the first PFPE in step (ii) is in a high-temperature state, and accordingly the resin layer is cooled down to room temperature of, for instance about 25° C., in step (iii) subsequent to into step (ii). In step (iv), next, the first PFPE in the resin layer is removed using a solvent, as a result of which there are formed pores having openings in the first surface of the resin layer at sites where the first PFPE in the resin layer was present.

The surface area proportion P2 of the pores per unit area in a cross section parallel to the circumferential direction of the surface layer having undergone step (iii) and step (iv) above is higher than a surface area proportion P1 of the openings per unit area in the first surface. It is considered that the reason is as follows.

When the PFA tube having thermally expanded on account of the heating in step (ii) shrinks in the cooling process of step (iii), cooling progresses more quickly at the first surface of the resin layer, and accordingly the extent of shrinkage is larger, than at the elastic layer-side surface of the resin layer. The first PFPE present in the vicinity of the first surface of the resin layer is pushed out of the resin layer from the first surface accompanying shrinkage of the first surface side. The diameter of the openings in the first surface of the resin layer shrinks as a result. On the other hand, the first PFPE having permeated deep into the resin layer, in the thickness direction thereof, for instance down to a position in the vicinity of the surface on the elastic layer side, is not released to the exterior of the resin layer even upon shrinkage of the resin layer, but remains within the resin layer. The aggregate portions of the first PFPE, which constitute voids after removal of the first PFPE exhibit therefore virtually no reduction in size. The proportion (P2/P1) of the porosity P2 relative to the opening ratio P1 of the first surface of the surface layer formed in step (iv) increases as a result.

Herein the value of P2/P1 can be adjusted on the basis of the impregnation amount of the first PFPE into the resin layer in step (ii). Specifically, increasing the impregnation amount of the PFPE into the resin layer allows increasing the voids formed in the interior of the resin layer, such that the value of P2 increases. Increasing the amount of impregnation into the resin layer translates into a greater number of openings in the first surface of the resin layer as well, and therefore likewise in an increased value of P1. Although the underlying reasons are unclear, the degree of increase in P1 derived from the increase in the amount of impregnation in the resin layer is larger than the degree of increase in P2. Accordingly, P2/P1 can be adjusted to be smaller by increasing the amount of first PFPE impregnated into the PFA tube.

To achieve the above preferable range of P2, the resin layer is preferably impregnated with the first PFPE so that the impregnation amount of the first PFPE into the resin layer in step (ii), in the form of the content ratio for the first PFPE relative to the mass of the resin layer that contains the first PFPE, is preferably 25 mass % to 60 mass %, and particularly preferably 30 mass % to 45 mass %.

The impregnation amount of the first PFPE into the resin layer can be adjusted for instance on the basis of the temperature of the first PFPE, the viscosity of the first PFPE and the contact time between the resin layer and the first PFPE at the time of impregnation. Specifically, the higher the temperature within a temperature range near the melting point of PFA (temperature of 250 to 350° C.), the lower is the viscosity of the first PFPE, the longer is the contact time, and the greater can be made the impregnation amount of the first PFPE into the resin layer.

A preferable viscosity of the first PFPE is 10 mPa·s to 400 mPa·s, more preferably 30 mPa·s to 350 mPa·s.

Examples of commercially available PFPE in such viscosity ranges include "Krytox GPL-101" (viscosity 12 mPa·s), "Krytox GPL-102" (viscosity 26 mPa·s), "Krytox GPL-103" (viscosity 54 mPa·s), "Krytox GPL-104" (viscosity 111 mPa·s), "Fomblin M03" (viscosity 30 mPa·s) and "Krytox GPL-105" (viscosity 301 mPa·s).

Herein a PFPE-impregnated resin layer having a content of the first PFPE of 30 mass % can be produced over a contact time of 1 minute in a case for instance where the viscosity of the first PFPE is 301 mPa·s, the thickness of the resin layer containing the PFA is 20 μm, the melting point of the resin layer is 296° C., and the temperature at the time of contact between the resin layer and the first PFPE is 310° C.

The term content is herein defined as the percentage (%) of the mass of the PFPE impregnated into the resin layer with respect to the sum of the mass of the resin layer itself plus the mass of the PFPE impregnated into the resin layer.

In a case where in the above example PFPE having a viscosity of 111 mPa·s is used as the first PFPE while other conditions remain the same, a PFPE-impregnated resin layer can be produced in which the content of the first PFPE is 41 mass %. In a case where in the above example the temperature at the time of contact is set to 300° C. while other conditions remain the same, a PFPE-impregnated resin layer can be produced in which the content of the first PFPE is 26 mass %.

The viscosity of "Krytox GPL106" as the PFPE used in the examples of WO 2019/181796 is 459 mPa·s. Upon contact of such PFPE with a resin layer containing PFA, at a temperature of 345° C. for 5 minutes, a PFPE-impregnated resin layer was obtained that had a PFPE content of 24 mass %. When the content of PFPE stands at that level, however, there is no PFPE aggregation within the resin layer. Accordingly, pores did not form in the resin layer, even upon subsequent elution of the PFPE using a fluorine-based solvent.

Any method can be used as the contact method of the resin layer and the first PFPE in the production of the fixing rotating member, so long as the PFPE can be brought into contact with the resin layer at a temperature near the melting point of the PFA resin contained in the resin layer.

Further, the resin layer that is brought into contact with the first PFPE may be a resin layer in a layered body in which a base layer, an elastic layer, and a resin layer are laid up on each other beforehand; alternatively, there may be prepared a PFA sheet or PFA tube for the resin layer, in a state where the surface to be bonded to the elastic layer is masked. For instance, a dipping method is a further example of the contact method.

In order to remove the first PFPE impregnated into the resin layer in step (iv) the first surface of the resin layer is immersed in a solvent capable of dissolving the first PFPE but which does not dissolve PFA, so that the first surface of the resin layer is wetted. The "solvent that dissolves PFPE" may be for instance a solvent such that the dissolution amount of PFPE in 100 g of the solvent at 25° C. is 10 g or greater. Meanwhile, the term "solvent which does not dissolve PFA" includes solvents such that the dissolution amount of PFA in 100 g of the solvent at 25° C. is 1 g or smaller. Examples of such a solvent include a hydrofluoroether (product name: Novec 7600; by The 3M Company).

To remove the first PFPE from the resin layer in step (iii) it is preferable to apply ultrasounds to the resin layer so as to promote removal of the first PFPE from the resin layer.

A method for producing a fixing rotating member according to one aspect of the present disclosure will be described more specifically next.

Step (i): A layered body being a stack of a base layer, an elastic layer containing silicone rubber, and a resin layer containing PFA, in this order, is mounted on a dipping device.

Step (ii): the layered body is immersed in a bath of PFPE heated to near the melting point of PFA (300° C.±50° C. (preferably 290° C. to 325° C.)), and is allowed to stand preferably for 20 seconds to 5 minutes, more preferably for 30 seconds to 2 minutes (for instance for 1 minute) (impregnation step-1).

It was found that in (impregnation step-1) the impregnation amount increases as the contact temperature between the resin layer and the first PFPE increases and as the viscosity of PFPE decreases. The contact temperature and the viscosity of PFPE can be selected as appropriate, so long as an impregnation amount is achieved which is equal to or greater than a given amount that allows forming the above specific pores.

Defining X° C. as the heating temperature of the first PFPE in impregnation step-1 and Y° C. as the melting point of PFA, preferably X-Y is 0° C. to 40° C., more preferably 3° C. to 20° C.

Step (iii): the layered body is removed from the bath of the first PFPE bath, and is cooled down to room temperature.

Step (iv): after cooling, the layered body is impregnated with the solvent capable of dissolving the first PFPE, to elute the first PFPE impregnated into the resin layer, from the openings of the first surface of the resin layer (pore formation step). Pores having openings in the first surface become formed in the resin layer as a result of this step.

Step (v-1): the layered body provided with the resin layer having pores and obtained as a result of the above steps is then immersed in a bath of the second PFPE, and is allowed to stand, preferably for 5 to 30 minutes, more preferably for 10 minutes to 20 minutes (for instance 15 minutes). As a result the second PFPE becomes incorporated into the pores in the resin layer (impregnation step-2).

The temperature of the second PFPE at this time is preferably a temperature that allows promoting impregnation of the second PFPE into the pores but such that the openings in the first surface of the resin layer do not disappear. As a non-limiting example, the lower limit of the temperature of the second PFPE in this step is preferably 180° C. or higher, and the upper limit is preferably 280° C. or lower, more preferably 230° C. or lower.

Step (v-2): the layered body obtained as a result of the above steps is retrieved from the bath of the second PFPE, and the second PFPE adhered to the outer surface is removed, to thereby yield a fixing rotating member according to one aspect of the present disclosure.

In the present step, the method for removing the excess amount of the second PFPE adhered to the surface is not particularly limited, and examples thereof include washing with a fluorosolvent, removal with air, and wipe-off using a nonwoven fabric. Examples of methods for washing with a fluorosolvent include a removal method using fibers such as a nonwoven fabric, impregnated with a fluorosolvent.

2. Fixing Apparatus

The fixing apparatus includes a fixing rotating member and a heating means for heating the fixing rotating member. The fixing apparatus includes for instance a heating rotating member, and a pressing rotating member disposed so as to form a fixing nip portion with the heating rotating member.

Examples of a combination of a heating rotating member and a pressing rotating member include for instance a heat roller and an elastic pressure roller disposed opposing the heat roller, and a heating film and an elastic pressure roller disposed in contact with the heating film. Other examples of a combination of a heating rotating member and a pressing rotating member include a heating belt and an elastic pressure roller disposed in contact with the heating belt, and a heating belt and an elastic pressure belt disposed in contact with the heating belt.

(1) Fixing Apparatus Using a Fixing Belt

Figure 3:
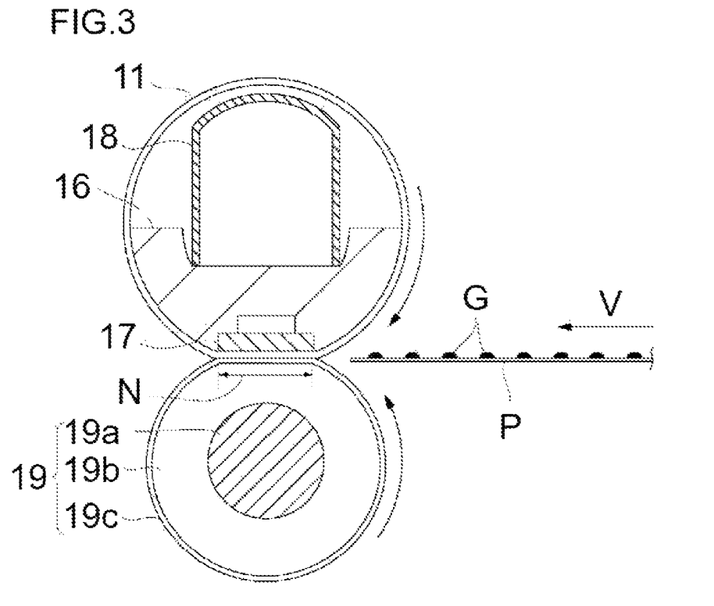
FIG. 3 is a cross-sectional schematic diagram of a fixing apparatus that utilizes a fixing belt.

FIG. 3 is a cross-sectional diagram of a fixing apparatus having the fixing belt 11 for heating and an elastic pressure roller 19, along the circumferential direction of a fixing belt.

The fixing belt 11 is the fixing belt described as the above fixing rotating member. The fixing belt 11 is loosely fitted from outside a belt guide member 16. A pressing rigid stay 18 is inserted inward of the belt guide member 16. The belt guide member 16 is formed of for instance a heat-resistant/heat-insulating resin.

The heating means is for instance a heater disposed in contact with the inner peripheral surface of the fixing belt. A ceramic heater 17 as a heat source is provided at a position at which the belt guide member 16 and the inner surface of the fixing belt 11 are in contact with each other. The ceramic heater 17 is fitted to and fixed in a groove provided along the longitudinal direction of the belt guide member 16. The ceramic heater 17 generates heat through energization by a means not shown.

The elastic pressure roller 19 is provided for instance with an elastic layer 19b containing a cured silicone rubber, on the peripheral surface of a core metal 19a made of stainless steel. A surface layer 19c containing a fluororesin is provided on the peripheral surface of the elastic layer 19b. The thickness of the surface layer 19c is for instance 50 μm.

A push-down force is exerted on the pressing rigid stay 18 by arranging pressure springs (not shown) between both ends of the pressing rigid stay 18 and spring receiving members (not shown) on the device chassis side. As a result, the lower face of the ceramic heater 17 disposed on the lower face of the belt guide member 16 and the top face of the elastic pressure roller 19 are pressed against each other, with the fixing belt 11 nipped in between, to form a predetermined fixing nip portion N. That is, the lower face of the ceramic heater 17 is disposed in contact with the inner peripheral surface of the fixing belt 11.

A recording medium P as a body to be heated having formed thereon an image by unfixed toner G is nipped and transported in the fixing nip portion N at a transport speed V. The toner image is heated and pressed as a result. In consequence the toner image melts, with color mixing, after which the toner image is cooled, whereby a toner image becomes fixed as a result on the recording medium P.

(2) Heat Fixing Apparatus Using a Fixing Roller

Figure 4:
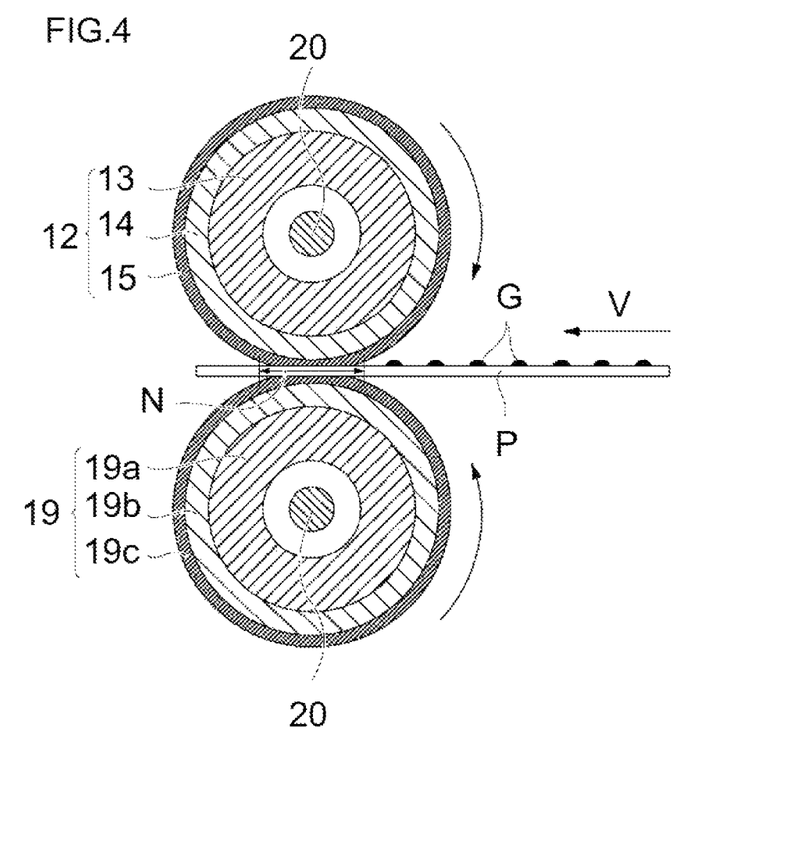
FIG. 4 is a cross-sectional schematic diagram of a fixing apparatus that utilizes a fixing roller.

FIG. 4 is a cross-sectional diagram along the circumferential direction of a fixing roller in a heat fixing apparatus that is provided with the fixing roller 12 for heating, the elastic pressure roller 19 disposed opposing the fixing roller 12, and a heater 20 which is a heating means of the fixing roller 12.

The fixing roller 12 is the fixing roller described as the above fixing rotating member. In the fixing roller 12 there are formed the elastic layer 14 on the outer peripheral surface of a hollow core metal as the base layer 13, and the release surface layer 15 on the outer side of the elastic layer 14.

The fixing roller 12 and the elastic pressure roller 19 are rotatably pressed against each other, by a pressure means not shown, so that the fixing nip portion N is formed as a result.

The heater 20 as a heat source for supplying heat necessary for melting the unfixed toner G is installed inside the fixing roller 12 and inside the elastic pressure roller 19. A halogen heater is generally used as the heater 20. A plurality of halogen heaters may be installed in the interior of the rollers depending on the size of the recording medium P to be transported.

Respective rotational forces are applied to the fixing roller 12 and the elastic pressure roller 19 through the ends of the base layer (core metal) 13 and the core metal 19a, by a means not shown, the rotation being controlled herein so that the moving speed of the surface of the fixing roller 12 is substantially equal to the transport speed V of the recording medium P. At this time, the rotational force may be applied to either one of the fixing roller 12 and the elastic pressure roller 19 having elasticity, so that the other roller rotates by being driven; alternatively, the rotational force may be applied to both rollers.

The recording medium P that is a body to be heated having formed thereon an image by the unfixed toner G is nipped and transported at the fixing nip portion N of the fixing apparatus formed as described above. The toner image is heated and pressed as a result. In consequence the toner image melts, with color mixing, after which the toner image is cooled, and a toner image becomes fixed as a result on the recording medium P.

3. Electrophotographic Image Forming Apparatus

A known configuration can be adopted as the electrophotographic image forming apparatus. Such apparatuses include multifunction devices, copiers, fax machines and printers that utilize an electrophotographic system. The overall structure of an electrophotographic image forming apparatus will be explained schematically herein using a color laser printer as an example.

Figure 5:
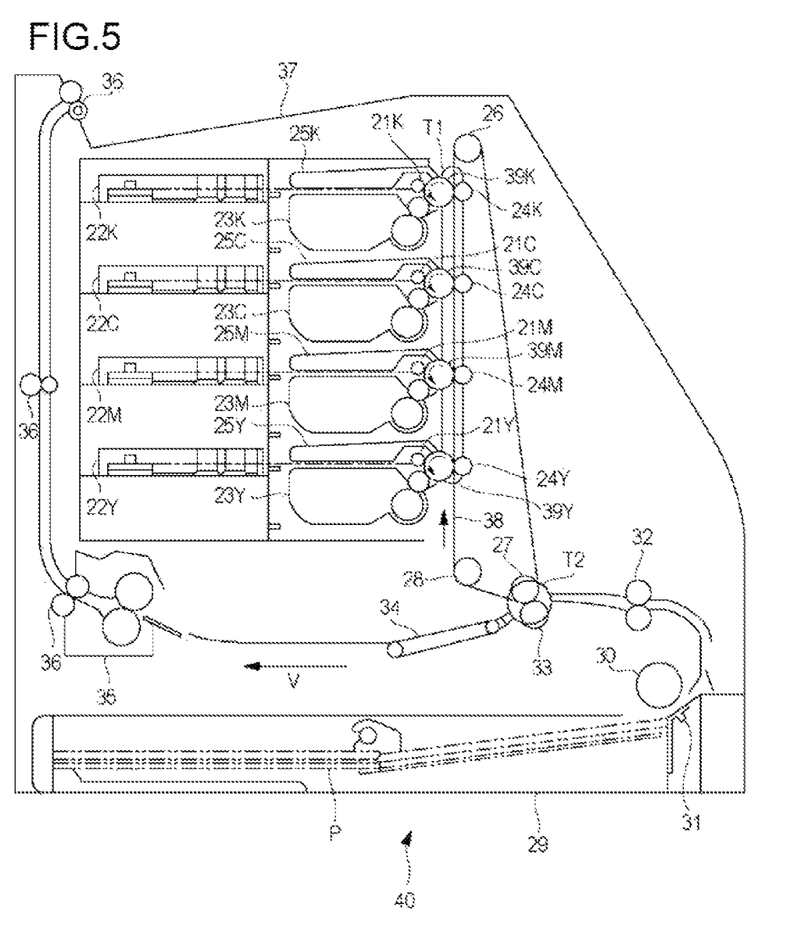
FIG. 5 is a schematic cross-sectional schematic diagram illustrating one aspect of an electrophotographic image forming apparatus.

FIG. 5 is a schematic cross-sectional diagram of a laser printer 40. The laser printer 40 illustrated in FIG. 6 has respective "electrophotographic photosensitive member drums 39 (hereafter referred to as "photosensitive member drums 39") that rotate at a constant speed for each respective color including yellow (Y), magenta (M), cyan (C) and black (K). The laser printer 40 further has an intermediate transfer member 38 which holds a color image, developed at an image forming section and resulting from multiple transfer, and which transfers the color image to the recording medium P that is fed from a feeding unit.

Each photosensitive member drum 39 (39Y, 39M, 39C, 39K) is rotationally driven counterclockwise, as illustrated in FIG. 5, by a driving means (not shown).

Around each photosensitive member drum 39 there are sequentially disposed, according to the rotation direction thereof, a respective charging device 21 (21Y, 21M, 21C, 21K) that charges uniformly the surface of the photosensitive member drum 39, a respective scanner unit 22 (22Y, 22M, 22C, 22K) that projects a laser beam, on the basis of image information, to form an electrostatic latent image on the photosensitive member drum 39, a respective developing unit 23 (23Y, 23M, 23C, 23K) that causes toner to adhere onto the electrostatic latent image, to thereby develop the toner in the form of a toner image, a respective primary transfer roller 24 (24Y, 24M, 24C, 24K) that transfers the toner image on the photosensitive member drum 39 to the intermediate transfer member 38, at a primary transfer section T1, and a respective cleaning unit 25 (25Y, 25M, 25C, 25K) having a cleaning blade that removes untransferred toner remaining on the surface of the photosensitive member drum 39 after transfer.

At the time of image formation, the belt-shaped intermediate transfer member 38 spanned around rollers 26, 27 and 28 rotates and the color toner images formed on respective photosensitive member drums 39 undergo primary transfer, superimposed on each other, onto the intermediate transfer member 38, so that a color image is formed as a result.

The recording medium P is then transported to a secondary transfer section T2 by a transport means, in synchrony with primary transfer to the intermediate transfer member 38. The transport means includes a feed cassette 29 that accommodates a plurality of sheets of the recording medium P, a feed roller 30, a separation pad 31, and a resist roller pair 32. At the time of image formation, the feed roller 30 is rotationally driven in accordance with the image forming operation, the recording medium P in the feed cassette 29 is separated sheet by sheet, and is transferred by the resist roller pair 32 to the secondary transfer section T2 at a timing synchronized with the image formation operation.

A movable secondary transfer roller 33 is disposed in the secondary transfer section T2. The secondary transfer roller 33 can move substantially in the vertical direction. At the time of image transfer, the secondary transfer roller 33 is pressed against the intermediate transfer member 38 with a predetermined pressure, via the recording medium P. Simultaneously therewith, bias is applied to the secondary transfer roller 33, and the toner image on the intermediate transfer member 38 becomes transferred to the recording medium P.

The intermediate transfer member 38 and the secondary transfer roller 33 are each driven, and accordingly the recording medium P nipped between the intermediate transfer member 38 and the secondary transfer roller 33 is transported in the direction of the left arrow in FIG. 5 at a predetermined transport speed V; the recording medium P is then further transported, by the transport belt 34, to the fixing unit 35 which is a subsequent process. In the fixing unit 35 the transferred toner image is fixed on the recording medium P through application of heat and pressure. The recording medium P is then discharged onto a discharge tray 37, on the top face of the apparatus, by discharge roller pairs 36.

An image forming apparatus capable of delivering a high-quality image of excellent image uniformity can be thus achieved by utilizing the fixing apparatus illustrated in FIG. 3 and FIG. 4 in the fixing unit 35 of the electrophotographic image forming apparatus illustrated in FIG. 5.

EXAMPLES

The present disclosure will be specifically described next with reference to examples. The present disclosure is not limited to the following examples.

In the present example a fixing member being a fixing rotating member was produced using the PFA resin and the perfluoropolyether below.

Fluororesin

PFA-1: "959HP-Plus" (product name, by Chemours-Mitsui Fluoroproducts Co., Ltd.)

PFA-2: "451HP-J" (product name, by Chemours-Mitsui Fluoroproducts Co., Ltd.)

Perfluoropolyether

PFPE-1: "Krytox GPL104" (product name, by The Chemours Company, 111 mPa·s (40° C.))

PFPE-2: "Krytox GPL105" (product name, by The Chemours Company, 301 mPa·s (40° C.))

PFPE-3: "Krytox VPF16256" (product name, by The Chemours Company, 1403 mPa·s (40° C.))

PFPE-4: "Krytox XHT-1000" (product name, by The Chemours Company, 1941 mPa·s (40° C.))

PFPE-5: "Fomblin M100" (product name, by Solvay Specialty Polymers Co., Ltd., 1327 mPa·s (40° C.))

PFPE-6: "Krytox GPL106" (product name, by The Chemours Company, 459 mPa·s (40° C.))

Example 1

Production of a Fixing Belt

Preparation of a Layered Body Having a Base Layer, an Elastic Layer and Resin Layer Containing PFA As a base layer there was prepared base material obtained through nickel electroforming and having an endless belt shape with an inner diameter of 30 mm, a width of 400 mm, and a thickness of 40 μm. The outer peripheral surface of this base material was subjected to a primer treatment.

As a starting material for forming the elastic layer there was prepared an addition-curable liquid silicone rubber (product name: SE1886, by Dow Corning Toray Co., Ltd.) containing no filler. To 61 parts by volume of this liquid silicone rubber there were added 38 parts by volume of spherical alumina (product name: Alunabeads CB-A305, by Showa Denko KK) as a spherical filler, and 1 part by volume of gas-phase carbon fibers (product name: VGCF-S, by Showa Denko KK, aspect ratio=100, average fiber length=10 μm).

An addition-curable silicone rubber composition for forming an elastic layer was thus prepared in this manner. The above composition was applied by ring coating onto the outer peripheral surface of the above base material, followed by heating for 4 hours at a temperature of 200° C., to elicit crosslinking of the layer of the addition-curable silicone rubber composition, and form thereby an elastic layer having a thickness of 300 μm.

The elastic layer surface was irradiated with ultraviolet rays in an ambient atmosphere, using an ultraviolet lamp disposed at a position spaced by 10 mm from the surface of the elastic layer, while the base material having the elastic layer formed thereon was caused to rotate at a moving speed of 20 mm/second. The ultraviolet lamp used herein was a low-pressure mercury ultraviolet lamp (product name: GLQ500US/11, by Toshiba Lighting & Technology Corporation), and irradiation was performed so that the integrated light intensity on the irradiated surface, at a wavelength of 185 nm, was 800 mJ/cm$^2$.

The surface of the elastic layer was then coated substantially uniformly, to a thickness of about 20 μm, with an addition-curable silicone rubber adhesive (product name: SE1819CV, equal mixture of "liquid A" and "liquid B", by Dow Corning Toray Co., Ltd.).

The inner surface was covered next with a hydrophilized fluororesin tube (PFA-1, 20 μm thick, melting point 296° C.), and the belt surface was uniformly squeezed from above the fluororesin tube to thereby remove excess adhesive from between the elastic layer and the fluororesin tube.

The base layer coated with the elastic layer and the fluororesin tube was placed then in an electric furnace set to at a temperature of 200° C., and the whole was heated for 1 hour, to cure the adhesive and bond the fluororesin tube onto the elastic layer, after which both ends were cut off, to yield a 343 mm-wide layered body for a fixing belt.

Contact Impregnation of the First PFPE
Impregnation Step-1

The first PFPE (PFPE-1) was placed in a graduated cylinder made of borosilicate glass. A heating wire covered with a thermal insulation material was wound around the whole graduated cylinder, and the graduated cylinder was heated up to a temperature of 310° C. of the PFPE. This preliminary fixing belt thus produced was mounted on a dipping device, and the layered body was immersed in the heated PFPE for 1 minute, and was then retrieved.

Evaluation A-1: Measurement of the Content of the First PFPE in the Resin Layer Impregnated with the First PFPE The content of the first PFPE in the obtained resin layer impregnated with the first PFPE was measured in accordance with the following method. Specifically, a multilayer sample of the elastic layer and the resin layer was cut out from the layered body. Next, the elastic layer was removed from the multilayer sample through dissolution of the silicone rubber in the elastic layer from the multilayer sample, by immersing the multilayer sample in a silicone resin dissolving agent (product name: e-Solve 21RS, by Kaneko Chemical Co., Ltd.). A measurement sample made up of only the entire thickness portion of the resin layer was prepared in this manner. This measurement sample was measured using a thermogravimetric analyzer (TGA) under the conditions below, and the content (mass %) of the first PFPE with respect to the resin layer containing the first PFPE was calculated.

Instrument: TGA851 (product name, by Mettler-Toledo International Inc.)
Atmosphere: air
Temperature: 425° C.

In a profile of measurement time-weight loss rate obtained on the basis of the above thermogravimetric analysis, a linear least squares approximation expression was worked out from the region at which the slope was constant and at which only PFA decreased. The intercept of the linear least squares approximation expression was taken as the PFA content (mass %), and the first PFPE content was calculated as first PFPE content (mass %)=100-PFA content).

Pore Formation Step

After cooling of the layered body obtained in the impregnation step-1 down to room temperature (25° C.), the layered body was immersed in a graduated cylinder containing a separately prepared fluorosolvent (product name: Novec 7300, by The 3M Company) for 10 minutes. Next, the graduated cylinder was placed in a water tank of an ultrasonic cleaning device (product name: Bransonic (model 2510J-DTH); by Emerson Japan, Ltd.), and was irradiated with ultrasounds for 60 minutes. After the treatment, the layered body was retrieved from the graduated cylinder and was dried by being allowed to stand in an environment at a temperature of 25° C. for 60 minutes. A layered body was thus obtained from which there was removed PFPE present on the surface and in the interior of the of the resin layer. The visual appearance of the obtained layered body was white, and pores were observed to have formed in the resin layer.

FIG. 1A and FIG. 1B illustrate schematic diagrams of observation images, by scanning electron microscopy, of the first surface of the resin layer of the obtained layered body, and of a cross section of the layered body in a direction along the circumferential direction.

FIG. 1A is a schematic diagram of an SEM image of the first surface. A resin portion 1 containing PFA and openings 2 were observed. FIG. 1B is a schematic diagram of an SEM image of a cross section of the resin layer in a direction along the circumferential direction of the layered body. The resin portion 1 containing PFA and the pores 3 were observed herein. It was found that the pores 3 had openings in the first surface 101 and had thus openings in the first surface.

Evaluation A-2: Calculation of the Opening Ratio P1, Average Opening Diameter and Porosity P2 on the First Surface of the Surface Layer (Resin Layer)

The opening ratio P1 and the average opening diameter of the first surface of the surface layer (resin layer) were calculated as follows.

The surface of the layered body having had the first PFPE removed therefrom and obtained in the above pore formation step, i.e. the surface of the resin layer on the reverse side from that opposing the elastic layer, was observed using a scanning electron microscope, and a SEM image (10000 magnifications) of a rectangular 8 μm long×11 μm wide observation region was acquired. The resolution was set to 717 pixels longitudinally and 986 pixels transversally so that the openings could be recognized. The acquired SEM image was converted into an 8-bit gray scale image using image processing software (product name: ImageJ, by the National Institutes of Health (NIH)). After application of a median filter to the obtained gray scale image, a binarization process was further carried out using the above image processing software, to obtain a binarized image. The binarization process relied on the YEN method, to discriminate between portions corresponding to the openings and portions corresponding to PFA in the SEM image. A ratio of the number of pixels of the portions corresponding to the openings in the obtained binarized image relative to the number of pixels of the entire image was then calculated. The observation regions were disposed at 10 arbitrary locations on the surface of the resin layer having openings, and the arithmetic mean value of the ratios calculated from respective observation regions was taken as P1. The observation regions were set to positions such that the observation regions did not overlap each other.

The surface areas of the portions corresponding to the openings in each binarized image were approximated to respective true circles of surface area identical thereto, and the arithmetic mean value of the diameters of the true circles (hereafter circle-equivalent diameters) was taken as the average opening diameter.

The porosity P2 was calculated as follows.

From the resin layer of the layered body having had the first PFPE removed therefrom a cross-sectional sample was cut out using a Cryo-Ultra-microtome (by Leica Microsystems GmbH), so that a cross section of the resin layer in a direction along the circumferential direction of the layered body appeared on the sample. The cross section was set to include the entire thickness portion of the resin layer. Next, the cross section was observed under a scanning electron microscope, and an SEM image of an observation region 8 µm long×11 µm wide was acquired. The resolution was set to 717 pixels longitudinally and 986 pixels transversally so that the pores appearing in the cross section could be discerned. The SEM image was binarized using numerical calculation software (product name: MATLAB; by The MathWorks, Inc.) to obtain a binarized image. The binarization process relied on Otsu's method to discriminate between portions corresponding to the pores and portions corresponding to PFA, in the SEM image. A ratio of the number of pixels of the portions corresponding to the pores in the binarized image relative to the number of pixels of the entire image was then calculated. The thickness-direction acquisition positions of the SEM images in the cross section of each cross-sectional sample were set to three locations as prescribed in (i) to (iii) below.

(i) In the cross section of the cross-section sample, a position such that 1 µm is the upper end of the observation region from the surface on one side of the surface layer (hereafter also referred to as "first surface") to the surface on the other side (hereafter also referred to as "second surface"), and such that and the long sides of the observation region are parallel to the first surface.

(ii) In the cross section of the cross-section sample, a position such that a midpoint between the first surface and the second surface of the surface layer, and the barycenter of the observation region, match each other and such that the long sides of the observation region are parallel to the first surface.

(iii) In the cross section of the cross-section sample, a position such that 1 µm from the second surface towards the first surface is the lower end of the observation region, and the long sides of the observation region are parallel to the second surface.

Samples for the above operation were acquired from three locations at every 120° in the circumferential direction of the layered body. Therefore, a total of nine SEM images were obtained in accordance with the above operation, and nine ratios were calculated on the basis of the binarized images created from the SEM images. The arithmetic mean value of these nine ratios was taken as the porosity P2.

Impregnation Step-2

The following operations were performed then on the layered body provided with the resin layer having pores and obtained as a result of the above pore formation step. Specifically, the second PFPE (PFPE-3) was placed in a graduated cylinder made of borosilicate glass.

A heating wire covered with a thermal insulation material was wound around the whole graduated cylinder, and the graduated cylinder and heated up so that the PFPE temperature became 200° C. Next, the layered body was attached to a dipping device, and the entire layered body was immersed in the heated second PFPE for 15 minutes, and was then retrieved.

Next, the second PFPE adhered to the outer surface of the retrieved layered body was removed using a nonwoven fabric impregnated with a fluorine-based solvent (product name: Novec 7300; by The 3M Company). The fixing belt according to the present embodiment was obtained in this manner. FIG. 1C illustrates a schematic diagram of an observation image, by scanning electron microscopy, of a cross section of a surface layer in a direction along the circumferential direction of the obtained fixing belt. It was found that the pores 3 observed in FIG. 1B became filled with the second PFPE 4 as a result of the impregnation step-2.

Evaluation A-3: Measurement of the Content of the Second PFPE in the Surface Layer Similarly to Evaluation A-1, a measurement sample of an obtained fixing belt was prepared which was made up of only the entire thickness portion of the surface layer. This measurement sample was measured using a thermogravimetric analyzer (TGA) under the under the conditions below, and there was calculated the content ratio (mass %) of the second PFPE in the surface layer, with respect to the total mass of the surface layer including the mass of the second PFPE in the pores.

Instrument: TGA851 (product name, by Mettler-Toledo International Inc.)
Atmosphere: air
Temperature: 425° C.

In a profile of measurement time-weight loss rate obtained as a result of the above thermogravimetric analysis, a linear least squares approximation expression was worked out from the region at which the slope was constant and only PFA decreased. The intercept of the linear least squares approximation expression was taken as the PFA content (mass %), and the second PFPE content was calculated as second PFPE content (mass %)=100-PFA content.

Evaluation of Performance as a Fixing Belt

The obtained fixing belt was subjected to the following Evaluations B-1 and B-2.

Evaluation B-1: Evaluation of Occurrence or Absence of Toner Offset

The fixing belt was attached to an electrophotographic image forming apparatus (product name: imageRUNNER-ADVANCE C5051; by Canon Inc.) in which the angle of a paper separation claw had been adjusted.

An image forming process was carried out then of forming a 10 cm×10 cm cyan solid image on A4-size paper (by International Paper Co., Ltd., basis weight 75 g/m²). The fixing temperature was set to 180° C., and the paper transport speed was set to 300 mm/sec.

Once the numbers of formed solid cyan images respectively reached 1 print, 10,000 prints, and 300,000 prints, one sheet A4-size plain thin paper (product name: CS-520, basis weight 52 g/m², by Canon Inc.) was run, to form a 10 cm×10 cm cyan solid image. The solid image formed on this plain thin paper was observed visually and under a microscope, and was evaluated according to the criteria below.

Evaluation Criteria

Rank A: neither toner offset nor missing toner.

Rank B: very slight toner offset and missing toner observed.

Rank C: Both toner offset and missing toner observed.

Rank D: plain thin paper became stuck to the fixing belt.

Evaluation B-2: Measurement of Surface Free Energy

In Evaluation 1, the surface free energy of the outer surface of the fixing belt immediately prior to the formation of a solid image on the plain thin paper was calculated in accordance with the "Kitazaki-Hata method" described in the literature "Journal of the Japan Adhesive Society", Japan Society for Adhesion, 1972, Vol. 8, No. 3, pp. 131-141. Specifically, there were measured the contact angles of the outer surface of the fixing belt with water, n-hexadecane and diiodomethane (measurement environment: temperature 23° C., relative humidity 55%).

The surface free energy was then worked out, using the measurement results of each contact angle, on the basis of the "extended Fowkes equation" according to the "Kitazaki-Hata theory" set forth in the above literature.

A contact angle meter (product name: DM-501, by Kyowa Interface Science Co., Ltd.) was used for the measurement, and analysis software (product name: FAMAS, by Kyowa Interface Science Co., Ltd.) was utilized for analyzing the surface free energy.

Example 2

A layered body provided with a resin layer having pores was produced in the same way as in Example 1, but herein the contact temperature between the resin layer and the first PFPE in the impregnation step-1 was set to the temperature given in Table 1. From the impregnation step-2 onwards, Fixing belt No. 2 was produced in the same way as in Example 1. The results of Evaluations A-1 to A-3 and Evaluations B-1 and B-2 for the obtained Fixing belt No. 2 are given in Table 1 and Table 2.

Example 3

A layered body provided with a resin layer having pores was produced in the same way as in Example 1, but herein the first PFPE in the impregnation step-1 was modified to the first PFPE given in Table 1. From the impregnation step-2 onwards, Fixing belt No. 3 was produced in the same way as in Example 1. The results of Evaluations A-1 to A-3 and Evaluations B-1 and B-2 for the obtained Fixing belt No. 2 are given in Table 1 and Table 2.

Examples 4 to 5

The type of the second PFPE used in the impregnation step-2 was modified as given in Table 1. Otherwise, Fixing belts No. 4 and 5 were produced in the same way as in Example 3. The results of Evaluations A-1 to A-3 and Evaluations B-1 and B-2 for the obtained Fixing belts No. 4 and 5 are given in Table 1 and Table 2.

Examples 6 and 7

A layered body provided with a resin layer having pores was produced in the same way as in Example 1, but herein the thickness of the resin layer was modified as given in Table 2. From the impregnation step-2 onwards, Fixing belts No. 6 and 7 were produced in the same way as in Example 3. The results of Evaluations A-1 to A-3 and Evaluations B-1 and B-2 for the obtained Fixing belts No. 6 and 7 are given in Table 1 and Table 2.

Example 8

A layered body provided with a resin layer having pores was produced in the same way as in Example 1, but herein the material type of the resin layer in the impregnation step-1 and the contact temperature with the first PFPE were modified as given in Table 1. From the impregnation step-2 onwards, Fixing belt No. 8 was produced in the same way as in Example 1. The results of Evaluations A-1 to A-3 and Evaluations B-1 and B-2 for the obtained Fixing belt No. 8 are given in Table 1 and Table 2.

Comparative Example 1

A layered body having a base layer, an elastic layer and a resin layer containing PFA was produced in the same way as in Example 1, and was used as Fixing belt No. C-1 according to the present comparative example. Table 2 sets out the results of Evaluations B-1 and B-2 for this Fixing belt No. C-1. The Fixing belt No. C-1 did not undergo the impregnation step-1, the pore formation step, or the second impregnation step, and accordingly Evaluations A-1 to A-3 were not carried out.

Comparative Example 2

A layered body having a resin layer that had pores was produced in the same way as in Example 1, but herein the material of the first PFPE in the method described in Example 1 was modified to the material given in Table 1. This layered body was used as Fixing belt No. C-2 according to the present comparative example. Table 1 and Table 2 set out the results of Evaluations A-1 and A-2 and Evaluations B-1 and B-2 performed on the obtained Fixing belt No. C-2. The Fixing belt No. C-2 according to the present comparative example did not undergo the impregnation step-2, and accordingly Evaluation A-3 was not performed.

Comparative Example 3

The material type of the first PFPE and the temperature at the time of contact in the impregnation step-1 of the method described in Example 1 were modified herein as given in Table 1. The result of Evaluation A-1 for the obtained layered body, i.e. the content ratio of PFPE in the resin layer containing the first PFPE obtained in the impregnation step-1 was herein 24 mass %.

The first PFPE in the resin layer could not be removed when this layered body was subjected to the pore formation step described in Example 1. Although the underlying reasons are unclear, it is deemed that due to the small amount of impregnation the first PFPE fail to aggregate and connect in the resin layer, and first PFPE intruded thus in between molecules of PFA; as a result, the first PFPE could not be eluted with the solvent. Accordingly, the impregnation step-2 was not performed, and the layered body obtained up to the impregnation step-1 was used as Fixing belt No. C-3 of the present comparative example. Table 1 and Table 2 set out the results of Evaluation A-1 and Evaluations B-1 and B-2 performed on the obtained Fixing belt No. C-3. As expounded above, pores could not be formed in the resin layer even in the pore formation step, and hence the impregnation step-2 was not performed; accordingly, neither Evaluation A-2 nor Evaluation A-3 was performed.

Comparative Examples 4 and 5

A base material was prepared the outer peripheral surface of which had undergone a primer treatment in the same way as in Example 1. The primer-treated surface of the base material was coated with a stretched porous PTFE tube (product name: Poreflon HP-010-30; by Sumitomo Electric Fine Polymer Inc.) to obtain a layered body having a porous resin layer. The second PFPE was introduced into the pores of the resin layer in the same way as in the impregnation step-2 of Example 1, but using herein this layered body. The contact time with the second PFPE was 3 minutes in Comparative example 4, and 9 minutes in Comparative example 5. The layered bodies resulting from impregnation of the resin layer with the second PFPE were used as Fixing belt Nos. C-4 and C-5. Table 1 and Table 2 set out the results of Evaluations A-2 and A-3, and Evaluations B-1 and B-2 for Fixing belts No. C-4 and C-5.

Comparative Example 6

A base material with a primer-treated outer peripheral surface was prepared in the same way as in Example 1. Next, an amorphous fluoropolymer (product name: Teflon AF2400, by The Chemours Company) was dissolved in a fluorosolvent (product name: Novec 7300, by The 3M Company), to prepare a 2.0 mass % solution. The base material was immersed in the above solution, was then applied, in accordance with a dipping method, so that film thickness was 20 μm. The immersion time was 10 sec, and the pull-up speed was 30 mm/sec. The base material having a coating film of the solution formed on the outer peripheral surface was then dried in an oven at a temperature of 160° C. for 15 minutes, to yield a layered body having a porous polytetrafluoroethylene (PTFE) film on the surface. Other than by using this layered body, the pores of the porous PTFE film were impregnated with PFPE-3 in the same manner as in the impregnation step-2 of Example 1, to yield a fixing belt according to the present comparative example. Table 1 and Table 2 set out the results of Evaluations A-2 and A-3 and Evaluations B-1 and B-2 of the obtained fixing belt.

Table 1 sets out the formulations of the fixing belts produced in Examples 1 to 8 and Comparative examples 1 to 6.

TABLE 1-1

| | | Resin layer | | | First PFPE (impregnation step -1) | | *1 PFPE content ratio (mass %) |
|---|---|---|---|---|---|---|---|
| | | Material type | Melting point (° C.) | Thickness (μm) | Material type | Temperature at contact (° C.) | |
| Example | 1 | PFA-1 | 296 | 20 | PFPE-1 | 310 | 41 |
| | 2 | PFA-1 | 296 | 20 | PFPE-1 | 300 | 26 |
| | 3 | PFA-1 | 296 | 20 | PFPE-2 | 310 | 30 |
| | 4 | PFA-1 | 296 | 20 | PFPE-2 | 310 | 30 |
| | 5 | PFA-1 | 296 | 20 | PFPE-2 | 310 | 30 |
| | 6 | PFA-1 | 296 | 50 | PFPE-2 | 310 | 30 |
| | 7 | PFA-1 | 296 | 80 | PFPE-2 | 310 | 30 |
| | 8 | PFA-2 | 305 | 20 | PFPE-1 | 320 | 27 |
| Comparative example | 1 | PFA-1 | 296 | 20 | — | — | — |
| | 2 | PFA-1 | 296 | 20 | PFPE-2 | 310 | 29 |
| | 3 | PFA-1 | 296 | 20 | PFPE-6 | 345 | 24 |
| | 4 | Porous PTFE | 330 | 30 | — | — | — |
| | 5 | Porous PTFE | 330 | 30 | — | — | — |
| | 6 | "Teflon AF2400" | 280 | 20 | — | — | — |

*[Mass of impregnated PFPE/(mass of impregnated PFPE + mass of resin layer itself)] × 100
*1 is the content ratio of the first PFPE in the PFPE-impregnated resin layer obtained in the impregnation step -1.

TABLE 1-2

| | | Physical characteristics of resin layer | | | | Second PFPE (impregnation step -2) | | *2 PFPE content ratio (mass %) |
|---|---|---|---|---|---|---|---|---|
| | | P1 (%) | P2 (%) | P2/P1 | Average opening diameter (nm) | Material type | Temperature at contact (° C.) | |
| Example | 1 | 9.7 | 40 | 4.1 | 120 | PFPE-3 | 200 | 38 |
| | 2 | 6.5 | 27 | 4.2 | 75 | PFPE-3 | 200 | 26 |
| | 3 | 3.9 | 30 | 7.7 | 79 | PFPE-3 | 200 | 29 |

TABLE 1-2-continued

|  |  | Physical characteristics of resin layer | | | | Second PFPE (impregnation step -2) | | *2 |
|---|---|---|---|---|---|---|---|---|
|  |  | P1 (%) | P2 (%) | P2/P1 | Average opening diameter (nm) | Material type | Temperature at contact (° C.) | PFPE content ratio (mass %) |
|  | 4 | 3.9 | 30 | 7.7 | 79 | PFPE-4 | 200 | 29 |
|  | 5 | 3.9 | 30 | 7.7 | 79 | PFPE-5 | 200 | 29 |
|  | 6 | 3.9 | 30 | 7.7 | 79 | PFPE-3 | 200 | 29 |
|  | 7 | 3.9 | 30 | 7.7 | 79 | PFPE-3 | 200 | 29 |
|  | 8 | 6.0 | 28 | 4.7 | 95 | PFPE-3 | 200 | 26 |
| Comparative example | 1 | — | — | — | — | — | — | — |
|  | 2 | 4.3 | 30 | 7.0 | 78 | — | — | — |
|  | 3 | — | — | — | — | — | — | — |
|  | 4 | 49.0 | 53 | 1.1 | 100 | PFPE-3 | 200 | 12 |
|  | 5 | 49.0 | 53 | 1.1 | 100 | PFPE-3 | 200 | 32 |
|  | 6 | 29.0 | 34 | 1.2 | 120 | PFPE-3 | 200 | 32 |

*[Mass of impregnated PFPE/(mass of impregnated PFPE + mass of resin layer itself)] × 100
*2 is the content ratio of the second PFPE in the surface layer.

Table 2 sets out the evaluation results of the fixing rotating members produced in Examples 1 to 8 and Comparative examples 1 to 6.

TABLE 2

|  |  | Evaluation 1 Evaluation rank | | | Evaluation 2 Surface free energy (mJ/m$^2$) | | |
|---|---|---|---|---|---|---|---|
|  |  | 1 print | 10,000 prints | 300,000 prints | Before printing | 10,000 sheets | 300,000 sheets |
| Example | 1 | A | A | A | 13.8 | 13.9 | 13.9 |
|  | 2 | A | A | A | 13.7 | 14.0 | 14.3 |
|  | 3 | A | A | A | 13.8 | 13.8 | 13.9 |
|  | 4 | A | A | A | 13.5 | 13.8 | 13.8 |
|  | 5 | A | A | A | 13.7 | 13.8 | 13.9 |
|  | 6 | A | A | A | 13.9 | 13.8 | 14.1 |
|  | 7 | A | A | A | 13.8 | 13.8 | 14.2 |
|  | 8 | A | A | A | 13.8 | 13.9 | 14.2 |
| Comparative example | 1 | D | D | D | 17.6 | 17.7 | 18.1 |
|  | 2 | D | D | D | 17.5 | 17.3 | 17.6 |
|  | 3 | A | A | D | 13.9 | 14.0 | 17.5 |
|  | 4 | A | C | D | 14.5 | 15.2 | 17.3 |
|  | 5 | A | B | D | 13.6 | 14.8 | 17.5 |
|  | 6 | A | C | C | 13.6 | 15.2 | 16.1 |

Table 2 reveals that excellent toner releasability even after prolonged use can be maintained in the fixing rotating members of the examples, and that a high-quality electrophotographic image can be formed as a result.

One aspect of the present disclosure makes it possible to obtain a fixing rotating member in which high toner releasability can be maintained over longer periods of time. Other aspects of the present disclosure make it possible to achieve a fixing apparatus and an electrophotographic image forming apparatus in which a high-quality electrophotographic image can be formed stably over long periods of time.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-217946, filed Dec. 25, 2020, and Japanese Patent Application No. 2021-194224, filed Nov. 30, 2021, which are hereby incorporated by references herein in their entirety.

What is claimed is:

1. A fixing rotating member comprising a base layer, an elastic layer and a surface layer, in this order,
the surface layer containing a tetrafluoroethylene-perfluoroalkyl vinyl ether copolymer and a perfluoropolyether;
the surface layer having pores with openings at a first surface thereof constituting an outer surface of the fixing rotating member; and
at least part of the pores containing the perfluoropolyether,
wherein:
when a first observation region 8 μm long×11 μm wide is placed on the first surface of the surface layer after removing the perfluoropolyether in the pores, and a ratio of a total sum of areas of the openings observed in the first observation region relative to an area of the first observation region is defined as P1; and
when a second observation region 8 μm long×11 μm wide is placed in a cross section of the surface layer after removing the perfluoropolyether in the pores, the cross section including an entire thickness portion of the surface layer along a circumferential direction of the fixing rotating member, and a ratio of a total sum of areas of the pores observed in the second observation region relative to an area of the second observation region is defined as P2,
P2/P1 is 1.3 or higher.

2. The fixing rotating member according to claim 1, wherein:
P1 is 1.0 to 15.0%; and
P2 is 20.0 to 60.0%.

3. The fixing rotating member according to claim 1, wherein a content of the perfluoropolyether in the surface layer is 20 to 60 mass %.

4. The fixing rotating member according to claim 1, wherein an average opening diameter of the openings in the outer surface of the surface layer is 1 to 5 μm.

5. The fixing rotating member according to claim 1, wherein a thickness of the surface layer is 12 to 100 μm.

6. The fixing rotating member according to claim 1, wherein the perfluoropolyether has a structure represented by formula (1):

wherein, in the formula (1), a, b, c, d, e and f are each independently 0 or a positive integer, satisfy $1 \leq a+b+c+d+e+f \leq 600$, and at least one from among a, b, c and d represents a positive integer.

7. The fixing rotating member according to claim 1, wherein the perfluoropolyether has at least one structure selected from the group consisting of formulae (2) to (5):

wherein, in the formula (2), n is a positive number such that PFPE viscosity at a temperature of 40° C. is 30 to 500 mPa·s;

wherein, in the formula (3), n' is a positive number such that PFPE viscosity at a temperature of 40° C. is 10 to 2500 mPa·s;

wherein, in the formula (4), n" and m are each independently a positive number, m/n" is a number from 0.5 to 2, and n"+m is a number such that PFPE viscosity at a temperature of 40° C. is 20 to 1400 mPa·s; and wherein, in the formula (5), n'" and m' are each independently a positive number, m'/n'" is a number from 20 to 1000, and n'"+m' is a number such that PFPE viscosity at a temperature of 40° C. is 20 to 1200 mPa·s.

8. The fixing rotating member according to claim 1, wherein P2/P1 is 5.0 or higher.

9. The fixing rotating member according to claim 1, wherein the fixing rotating member is a fixing belt having an endless belt shape.

10. The fixing rotating member according to claim 1, wherein P2/P1 is 20.0 or lower.

11. A fixing apparatus, comprising a fixing rotating member, and heating means for heating the fixing rotating member,
wherein:
the fixing rotating member comprises a base layer, an elastic layer and a surface layer, in this order;
the surface layer contains a tetrafluoroethylene-perfluoroalkyl vinyl ether copolymer and a perfluoropolyether;
the surface layer has pores with openings at a first surface thereof constituting an outer surface of the fixing rotating member;
at least part of the pores contains the perfluoropolyether;
when a first observation region 8 μm long×11 μm wide is placed on the first surface of the surface layer after removing the perfluoropolyether in the pores, and a ratio of a sum total of areas of the openings observed within the first observation region relative to an area of the first observation region is defined as P1; and
when a second observation region 8 μm long×11 μm wide is placed on a cross section of the surface layer after removing the perfluoropolyether in the pores, the cross section including an entire thickness portion of the surface layer along a circumferential direction of the fixing rotating member, and a ratio of a total sum of areas of the pores observed in the second observation region relative to an area of the second observation region is defined as P2,
P2/P1 is 1.3 or higher.

12. The fixing apparatus according to claim 11, wherein:
the fixing rotating member is a fixing belt having an endless belt shape; and
the heating means is a heater disposed in contact with an inner peripheral surface of the fixing belt.

13. An electrophotographic image forming apparatus, comprising the fixing apparatus of claim 11.

14. The fixing rotating member according to claim 1, wherein a content of the perfluoropolyether in the surface layer is 26 to 60 mass %.

* * * * *